ELECTRONIC AMPLIFIER NETWORK

Filed Aug. 9, 1954 2 Sheets-Sheet 1

INVENTOR.
Hugo Romander
BY [signature]
ATTORNEYS

March 3, 1959 H. ROMANDER 2,876,298

ELECTRONIC AMPLIFIER NETWORK

Filed Aug. 9, 1954 2 Sheets-Sheet 2

INVENTOR.
HUGO ROMANDER
BY
ATTORNEY 2,876,298
Patented Mar. 3, 1959

2,876,298

ELECTRONIC AMPLIFIER NETWORK

Hugo Romander, Redwood City, Calif., assignor to Sierra Electronic Corporation, San Carlos, Calif., a corporation of California Application August 9, 1954, Serial No. 448,539

8 Claims. (Cl. 179—171)

This invention relates generally to electronic amplifier networks such as are suitable for use with communication transmitters.

In general it is an object of the present invention to provide an improved electronic power amplifier capable of efficient operation on a selected frequency within a relatively wide frequency range, and which is characterized by a high degree of stability and absence of undesired harmonics.

Another object of the invention is to provide an electronic amplifier of the above type which is relatively free of stray feedback effects.

Another object of the invention is to provide an electronic power amplifier suitable for use over a frequency range of the order of from 30 to 300 kc. and capacities of the order of 15 kw. or more, and which can operate at a selected frequency within such range without adjustment of any of its component elements.

Additional objects and features of the invention will appear from the following description in which the preferred embodiment has been set forth in detail in conjunction with the accompanying drawings in which.

Figure 1:
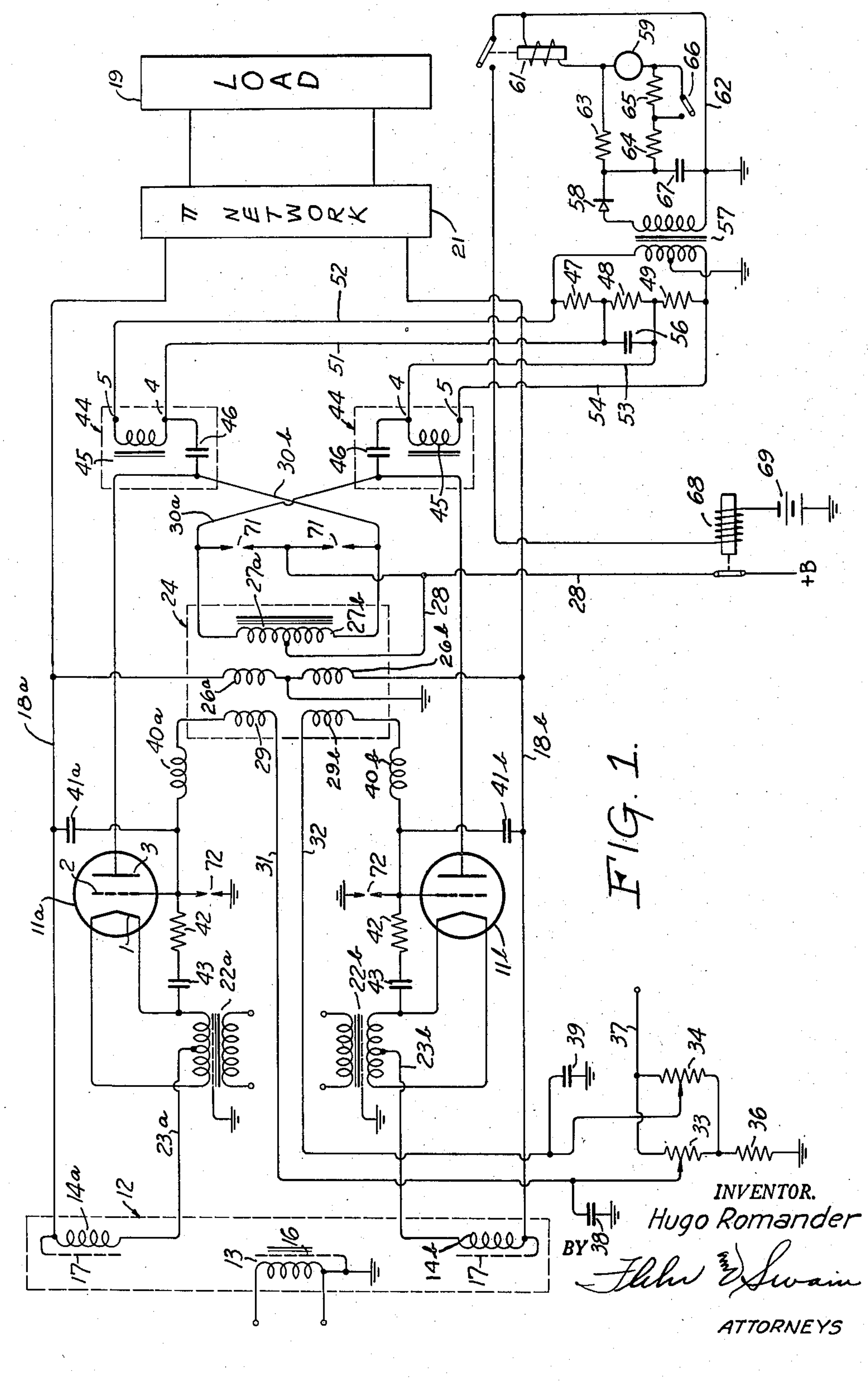
Fig. 1 is a schematic drawing of one preferred embodiment of the invention.

The amplifier network illustrated in Fig. 1 of the drawing includes a pair of tubes 11*a* and 11*b*, which may for example be of the type known by manufacturer specifications as No. 3X2500F3. The elements of each tube may includes the cathode 1, grid 2, and plate 3.

The input circuit for the tubes includes the input transformer 12, which is provided with a primary coil 13, and the two secondary coils 14*a* and 14*b*. One terminal of the primary coil 13 can be grounded as illustrated, and connected to electrostatic shielding 16. The terminals of the primary coil 13 are connected to a source of radio frequency energy to be amplified, such as the output of a preceding electronic amplifier. Each of the secondary coils 14*a* and 14*b* is preferably provided with electrostatic shielding 17 connected to one terminal of the corresponding coil.

A pair of transformers 22*a* and 22*b* serve to supply heating current to the cathodes 1. According to conventional practice the primaries of these transformers connect to a suitable source of alternating current supply. The secondaries of these transformers are insulated with respect to ground, and are provided with center taps connected by conductors 23*a* and 23*b* to one terminal of the coils 14*a* and 14*b*, respectively.

An output transformer 24 is provided with a set of secondary coils 26*a* and 26*b*, which have their adjacent terminals connected to ground. The remote high voltage terminal of coil 26*a* is directly connected by a lead 18*a* to the other terminal of coil 14*a*. Similarly the ungrounded terminal of coil 26*b* is connected by a lead 18*b* to the other terminal of coil 14*b*. The transformer 24 also includes the primary coils 27*a* and 27*b*, which have their adjacent terminals connected to a lead 28 that extends to a suitable source of plate voltage. The ungrounded or remote high voltage terminals of coils 27*a* and 27*b* are inversely connected to the plates 3 of the two tubes 11*a* and 11*b* by the cross connected leads 30*a* and 30*b*.

In addition to the coils 26*a*, 26*b*, 27*a* and 27*b*, it is desirable to provide the transformer with a third set of coils 29*a* and 29*b*. Adjacent terminals of coils 29*a* and 29*b* are connected by leads 31 and 32, respectively, to adjustable means for supplying a desired negative bias to the grids. This means can consist of a pair of potentiometers 33 and 34, which have their terminals connected together. One side of this arrangement is grounded through resistor 36, and the other side connected by lead 37 to a source of negative grid bias. The taps of the potentiometers 33 and 34 are connected respectively to the leads 31 and 32. High frequency bypass capacitors 38 and 39 connect between the leads 31 and 32 and ground. The other terminal of each transformer coil 29*a* and 29*b* is connected to the control grid of the associated tube through supplemental choke inductances 40*a* and 40*b*. Grid by-pass capacitors 41*a* and 41*b* connect between each grid and the corresponding lead 18.

The load 19 for the amplifier circuit is connected to the ungrounded terminals of windings 26*a* and 26*b* through an impedance matching network 21. In accordance with conventional practice network 21 may be a pi filter, the elements of which are adjusted for each desired frequency of operation to match the output impedance of the amplifier circuit to load 19. The elements described above constitute the basic amplifier circuit of the present invention.

The circuit of Fig. 1 also includes certain additional elements which are provided to improve the operation of the circuit, to permit the circuit to operate at high power levels, and/or to facilitate the adjustment of the circuit previously described.

As shown in Fig. 1 each grid is connected to its associated cathode by a damping resistor 42 which is in series with the capacitor 43. Resistor 42 and capacitor 43 suppress any tendency of the circuit to self-oscillate at high frequencies.

In order to indicate a proper match between the amplifier impedance and the impedance of load 19, I provide means including the coupling devices 44 which may be constructed as disclosed and claimed in co-pending application, Serial No. 330,808, filed January 12, 1953, now Patent No. 2,808,566. Each of these devices consists of a small current transformer 45 which is electromagnetically associated with a portion of the corresponding plate lead 30*a* and 30*b*. Voltages are developed across the terminals 4 and 5 of this current transformer, which are proportional to the current in the plate lead. The terminal 4 of each device 44 is connected to the corresponding lead 30*a* or 30*b* by a capacitor 46. Capacitor 46 together with capacitor 56 form a voltage divider serving to derive a voltage proportional to the voltage upon the associated lead 30a and 30b.

At a point which may be remote from the other parts of the amplifier, I provide a series of connected resistors 47, 48, and 49. The terminals of resistor 47 are connected by leads 51 and 52 to the terminals 4 and 5 of one of the couplers 44. The terminals of resistor 49 are connected to the leads 53 and 54 which connect respectively with the terminals 4 and 5 of the other couplers 44. The terminals of resistor 48 are therefore necessarily connected to the leads 51 and 53. Resistor 48 is shunted by the capacitor 56. Resistors 47 and 49 are connected in parallel with the secondaries of the current transformers 45 while the capacitor 56 connects between the terminals 4 of the couplers, and therefore cooperates with the capacitors 46 to form a voltage divider.

The transformer 57 has its primary connected to the leads 52 and 54, and the center point of the primary is connected to ground as illustrated. The secondary of transformer 57 is connected to a circuit including the rectifier 58, an indicating meter such as the microammeter 59, and the winding of a relay 61. Thus, grounded lead 62 connects one terminal of the transformer secondary to one terminal of the winding of relay 61. The other relay terminal connects to the rectifier 58 through resistor 63. The series connected resistors 64 and 65 which are also in series with microammeter 59 are connected across the terminals of resistor 63. Resistor 65 is shown provided with a shunting out switch 66 for sensitivity adjustment. Capacitor 67 connects between the grounded lead 62 and the point of connection between the rectifier and resistor 63.

The contacts of the relay 61 connect between the grounded lead 62 and the winding of the magnetic switch 68. The circuit for switch 68 includes a suitable source of current, represented by the battery 69. The contacts of relay 61 are in series with the plate current supply leads 28, whereby when the winding of switch 68 is energized the plate current supply is disconnected from the plates of the tubes. Relay 61 is adjusted for marginal operation whereby when the rectified current flow exceeds a predetermined maximum, the contacts of this relay are closed to energize the switch 68.

With the arrangement of coupling devices 44 and the indicating means just illustrated, it is a simple matter to adjust components of the filter comprising the load 19 whereby the impedance of the network as it appears from the plate circuit of the amplifier, is matched with the impedance of the amplifier plate circuit. Proper matching is indicated by a null reading of the microammeter 59. Relay 61 can then be marginally adjusted whereby when an unsafe condition exists, tending to cause an abnormal unbalance of the system, the relay switch 68 is operated to disconnect the plate current supply.

Suitable means can be provided to protect the network against excessive voltages. Thus the spark gaps 71 are shown connected across the terminals of the primary coils 27a and 27b. Additional spark gaps 72 are shown connected between the control grids and ground.

Figure 2:
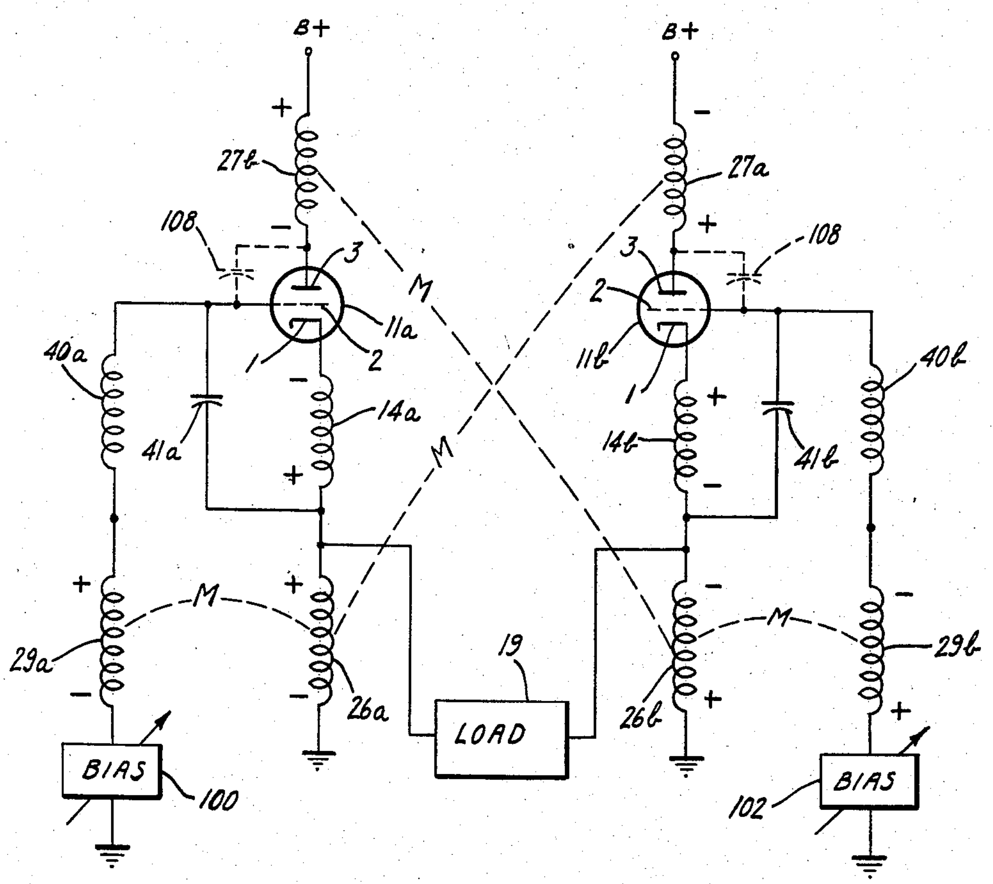
Fig. 2 is a simplified schematic drawing of the circuit of Fig. 1.

Fig. 2 is a circuit showing the essential elements of Fig. 1 redrawn to show more clearly the location of the individual elements in the circuit. In redrawing the circuit the windings of transformer 12 and 24 have been separated. However, the coupling between the various windings of these transformers is indicated by broken lines bearing the letter M. The primary winding 13 of input transformer 12 is not shown in Fig. 2 in order to simplify the drawing. The bias supplied 33—34—36—37 of Fig. 1 has been replaced by two separate bias sources 100 and 102 in order to simplify the drawing. The two bias sources 100 and 102 of Fig. 2 are the electrical equivalent of the single source of Fig. 1. The coupling devices 44 and the measuring circuits associated therewith have been omitted in redrawing the circuit. The parasitic oscillation suppressors 42 and 43 have also been omitted. The protective devices such as gaps 71 and 72 and relay 68 which form no part of the invention per se have been omitted. Capacitors 108a and 108b shown in broken lines in Fig. 2 represent the relatively large grid-to-plate capacitance which is present in any triode vacuum tube. It will be shown that this capacitance is effectively across the load circuit 19 and therefore does not affect the operation of the circuit of Fig. 2. Polarity markings have been added to each of the transformer windings shown in Fig. 2 in order to assist the reader in following the explanation of the operation of the circuit. It is to be understood however that oscillatory voltages appear across each of these transformer windings so that the polarity of the A. C. voltage appearing across any winding reverses at the frequency of the signal supplied to input windings 14a and 14b. It should be noted that winding 27b is in the anode circuit of tube 11a and that winding 27a is in the anode circuit of tube 11b. This results from the cross-connection of leads 30a and 30b in Fig. 1.

It is known that even order harmonic voltages appear at the anodes of the two tubes of a push-pull circuit. Successful cancellation of these even order harmonic voltages depends upon close coupling between the two primary windings of a push-pull transformer. It has been shown that leakage inductance between the primary windings of the output transformer of a push-pull amplifier cause the output of the amplifier to decrease as frequency increases. The leakage inductance between the primary windings of a push-pull transformer also introduces finite time constants into the amplifier circuit. In a class B circuit these transients will distort the output wave as one of the tubes changes from a conducting condition to a blocked condition and vice versa. This latter effect produces considerable distortion at higher audio frequencies. If the two primary windings of the output transformer are spaced close together for low leakage inductance, a relatively high distributed capacitance will result which will cause a reduction in the output of the amplifier at higher frequencies. Therefore it is generally impossible to design a conventional push-pull amplifier for satisfactory wide band operation.

These difficulties of push-pull amplifiers may be overcome through the use of inverse-parallel circuits of the type shown in Fig. 1. In the inverse-parallel type of circuit the windings of the output transformer may be placed close together without introducing undesirably high interwinding capacitance. It should be remembered that the effect of interwinding capacitance is a function not only of the physical capacitance between the windings but the voltage which exists between adjacent turns of the two windings. In a circuit of Figs. 1 and 2 the effect of interwinding capacitance is reduced by reducing to substantially zero the A. C. potential difference between adjacent turns of the different windings. Prior to the present invention all known forms of the inverse-parallel circuits have operated on the grounded cathode or cathode separation principle. The circuit of the present invention operates on the grid separation principle. Circuits of the grid separation type have the advantage of higher voltage gain and somewhat better inherent stability than circuits of the grounded cathode or cathode separation type. The grid separation type of circuit has the further advantage that this type of circuit permits contribution of power to the output circuit by the source of excitation power. The manner in which this transfer of power takes place will be explained presently.

Turning now to the circuit of Fig. 2 it will be seen that the grid 2 of tube 11a is connected to the lower end of winding 14a by capacitor 41a. Capacitor 41a is substantially a short circuit at all frequencies to be amplified. Therefore the only signal appearing between grid 2 and cathode 1 of tube 11a is the potential appearing across winding 14a of the input transformer 12. Similarly the grid 2 of tube 11b is connected to the lower terminal of winding 14b by the large capacitor 41b. The only signal potential existing between grid 2 and cathode 1 of tube 11*b* is the signal potential appearing across input transformer winding 14*b*. As shown by the polarity markings adjacent windings 14*a* and 14*b*, the signal voltages appearing across these windings are oppositely phased.

Suppose for the moment that the polarity of the signal voltage across winding 14*a* is as shown in Fig. 2, that is, that the cathode is negative with respect to the grid in tube 11*a*. The increase in plate current through tube 11*a* which results from the negative voltage on the cathode will cause a signal voltage to be developed across winding 27*b* of the polarity indicated by the plus and minus signs adjacent this winding. As shown, the instantaneous potential of anode 3 is more negative than the B supply voltage. Similarly the increase in current through tube 11*a* will cause a signal voltage of the polarity indicated to be developed across winding 26*a* in the cathode circuit of tube 11*a*. Windings 27*b* and 26*a* are formed with the same number of turns. Since these two windings carry the same current it follows that the signal voltage developed across winding 27*b* will be exactly the same as the voltage developed across winding 26*a*. The source of anode supply potential has a very low impedance at signal frequencies. This places the lower end of winding 26*a* at the same signal potential as the upper end of winding 27*b*.

Winding 26*a* is tightly coupled to winding 27*a* so that there is induced across winding 27*a* a potential equal to the potential appearing across winding 26*a*. The polarity of this potential is shown by the plus and minus signs adjacent winding 27*a*. Similarly, winding 27*b* is tightly coupled to winding 26*b* so that a signal potential appears across winding 26*b* of the polarity shown by the plus and minus signs adjacent winding 26*b*. The lower terminal of 26*a*, the lower terminal of winding 26*b*, the upper terminal of winding 27*b* and the upper terminal of winding 27*a* are all at the same A. C. potential, these points being connected by the low impedance B supply of the amplifier. Therefore it will be seen that the upper terminal of winding 26*a* is at the same signal potential as the lower terminal of winding 27*a*.

Turning to Fig. 1 it will be seen that the terminal of winding 26*a* which is connected to winding 14*a* lies adjacent to the terminal of winding 27*a* which is connected to the anode of tube 11*b*. Since these two terminals are at the same signal potential the interwinding capacitance between these two windings will not have any undesirable shunting effect at any frequency. A study of Fig. 1 will show that corresponding points anywhere along windings 26*a* and 27*a* are at the same potential so that there is substantially no coupling between these windings due to the interwinding capacitance.

The voltage developed across the cathode impedance 26*a* of the conducting tube induces a voltage across the anode impedance 27*a* of the non-conducting tube which is equal in magnitude but oppositely phased to the voltage developed across the anode impedance 27*b* of the conducting tube. Similarly a voltage is induced across the winding 26*b* of the cathode impedance of the non-conducting tube which is equal to but oppositely phased to the voltage appearing across the cathode impedance 26*a* of the conducting tube. This, together with the fact that the windings 26*a* and 27*b* can be placed close together thereby to achieve substantially unity coupling between the two windings of each pair substantially completely eliminates the effect of leakage inductance between the anode windings 27*a* and 27*b* and cathode windings 26*a* and 26*b*.

Placing windings 26*a* and 26*b* on the same core as windings 27*a* and 27*b* as shown in Fig. 1 has the advantage of saving space and core material. This arrangement also eliminates the need for certain coupling capacitors within the circuit. However, it should be understood that windings 26*a* and 26*b* may be placed on one core and windings 27*a* and 27*b* on a separate core if desired provided that points at the same signal potential in the circuit of Fig. 2 are coupled together by means of suitable capacitors. That is, in the circuit of Fig. 2, the mutual coupling between winding 26*a* and winding 27*a* may be replaced by a capacitor connected between the junction of winding 26*a* and winding 14*a* and the anode 3 of tube 11*b*. Similarly the mutual coupling between winding 26*b* and winding 27*b* may be replaced by a capacitor between the upper terminal of winding 26*b* and the lower terminal of winding 27*b*.

As explained above, the grid 2 of tube 11*a* is effectively at the signal potential of the upper end of winding 26*a*. Therefore the grid terminal of the grid-to-anode capacitance 108*a* of tube 11*a* is effectively connected to the left hand end of the load 19. Since the anode 3 of tube 11*a* is at the same signal potential as the upper end of winding 26*b*, it can be considered that the anode terminal of the grid-to-anode capacitance 108*a* of tube 11*a* is connected to the upper end of winding 26*b*. This places the grid-to-plate capacitance of tube 11*a* in shunt with the load 19. It can be shown that the grid-to-plate capacitance of tube 11*b* is also in shunt with load 19. Thus the effect of the grid-to-plate capacitance of the tubes 11*a* and 11*b* may be effectively eliminated by proper tuning of the pi network 21 in Fig. 1 which forms a part of the load of the amplifier circuit.

It should be remembered that one of the novel features of the present invention is that the driving signal is supplied in series with the anode-cathode path of tubes 11*a* and 11*b* rather than in shunt with this path as was done in prior art circuits of the inverse-parallel type. It is this series connection of the driving signal source which permits the transfer of energy from the driving source to the load 19. It is also this series connection which permits the tubes 11*a* and 11*b* to be operated in the fashion of a grid separation circuit or grounded grid circuit rather than as a grounded cathode or cathode separation circuit.

The manner in which energy is transferred from the primary winding 13 of Fig. 1 to the load 19 will now be explained. As shown in Fig. 2, secondary windings 14*a* and 14*b* of input transformer 12 are in the anode-cathode circuit of tubes 11*a* and 11*b* respectively. The driving signal appearing across winding 14*a*, for example, adds to the effective anode-to-cathode voltage of tube 11*a* and therefore increases the signal voltage which will appear across windings 27*b* and 27*a*. Similarly when tube 11*b* is conducting the voltage appearing across winding 14*b* adds to the anode-to-cathode voltage of tube 11*b* and causes an increase in signal voltage across windings 27*a* and 26*b*. It can be shown that the phase of the current through coil 14*a* with respect to the voltage appearing across it is such that energy is in fact transferred from this winding to the load 19.

It has been assumed up to this point in the discussion that proper D. C. biases are supplied to grids 2 of tubes 11*a* and 11*b*. The function of windings 29*a* and 29*b* in providing this bias will now be explained. The potential of grid 2 of tube 11*a* will vary with respect to ground potential as a result of the signal potential appearing across winding 26*a*. This is so because the grid 2 is connected to the upper terminal of winding 26*a* through capacitor 41*a*. While it would be possible to return the grid 2 to bias source 100 through a large inductance or choke this would be undesirable since resonances may occur due to distributed capacitances of the choke winding. These self-resonances cause the gain of the amplifier to be frequency dependent in at least some regions of the desired operating band. The degree to which these self-resonances will affect the operation of the circuit will depend to a certain extent on the amplitude of the signal voltage appearing across the choke. The need for the large choke is eliminated in the circuit of Fig. 2 by inserting in series with the bias source 100 the winding 29*a* which has a potential induced thereacross which is equal to the potential appearing across winding 26*a*. This correspondence in induced potential is made possible by the tight coupling of winding 29a to winding 26a. Therefore the signal potential existing across choke 40a is very low, ideally zero. This reduction in signal voltage across choke 40a reduces the frequency sensitivity of the system resulting from self-resonances in inductor 40a. Furthermore it permits choke 40a to be of a relatively small size since the only function of this choke is to block the small residual signal voltage which may appear thereacross due to slight inequalities which may exist in the signals appearing across windings 26a and 29a. Again it should be noted that corresponding turns of windings 26a and 29a are at the same signal potential. Therefore the effect of any interwinding capacitance between windings 26a and 29a may be neglected. Similarly, winding 29b, which is coupled to winding 26b, is connected in the grid circuit of tube 11b and reduces the signal potential appearing across choke 40b to substantially zero. The D. C. bias on grids 2 of tubes 11a and 11b may be adjusted by adjusting bias sources 100 and 102 of Fig. 2. In the circuit of Fig. 1 the adjustment of D. C. bias is accomplished by adjusting the taps on potentiometers 33 and 34.

A characteristic of my amplifier network is that it remains stable and does not tend toward self-oscillation for operation over a relatively wide range of frequencies of say from 30 to 300 kc. The network is relatively simple with respect to the size and weight of the component elements required, and it makes possible the use of triodes as distinguished from more elabtorate tubes which require additional external elements for their operation. Generation of harmonics is reduced to a minimum, thus increasing efficiency of operation and simplifying the design of a filter for connection with the output.

As an example of actual practice one network was constructed in accordance with the drawing and with various electrical components as follows: The input transformer 12 was of the ferrous magnetic core type, with the primary comprising 40 turns of No. 20 copper wire. Each of the secondary coils 14 comprised 8 turns of 64/#40 litzendraht.

The cathode current supply transformers 22 were of conventional construction, with the windings proportioned to supply voltage to the cathodes of the desired value. The secondary winding of transformer 22 was insulated from primary and core for high R.-F. voltages. The output transformer 24 was of the magnetic ferrous core type, with each of the primary coils 27 comprising 54 turns of 64/#40 litzendraht copper wire.

The secondary coils 26 of the transformer 24 comprised 108 turns of No. 20 wire. The coils 29 comprised 54 turns each of 64/#40 litzendraht. The chokes 40 each formed an inductance of 2 millihenries. Each of the current transformers 45 were constructed with a secondary winding comprising 100 turns of No. 31 wire. The values of the various resistors employed were as follows:

| | |
|---|---|
| **33**—350Ω | **48**—56,000Ω |
| **34**—350Ω | **49**—360Ω |
| **36**—600Ω | **63**—390Ω |
| **42**—40Ω | **64**—560Ω |
| **47**—360Ω | **65**—1,000Ω |

Each of the various capacitors employed had values as follows:

| | |
|---|---|
| **38**—2μf | **46**—10μμf |
| **39**—2μf | **21**—100 to 2,000μμf |
| **41**—0.5μf | **56**—1,500μμf |
| **43**—.001μf | **67**—0.1μf |

The tubes employed were known by manufacturers' specifications as No. 3X2500F3.

The network constructed as specified above gave stable amplification with a power output of 15 kw. for an R.-F excitation input of 1.5 kw., on any selected frequency over a frequency range of from 30 to 300 kc. With respect to the power supplied to the load, about 1 kw. represented energy transferred directly from the input, and the remainder represented amplified energy.

I claim:

1. An amplifier circuit comprising, first, second, third and fourth transformer windings, said four windings being substantially electrically identical, first and second electron tubes each having at least an anode, a cathode, and a control grid, a source of anode supply potential having a positive terminal and a negative terminal, said first transformer winding being connected between said anode of said first electron tube and said positive terminal of said source of anode supply potential, said second transformer winding being connected between said anode of said second electron tube and said positive terminal, an input transformer having a primary winding to which a signal to be amplified may be supplied, and first and second secondary windings, said third transformer winding being connected between said negative terminal of said source of anode supply potential and a first junction point with one terminal of said first secondary winding, the other terminal of said first secondary winding being connected to the cathode of said first electron tube, said fourth transformer winding being connected between said negative terminal of said source of anode supply potential and a second junction point with one terminal of said second secondary winding, the other terminal of said second secondary winding being connected to the cathode of said second electron tube, said second and said third windings being coupled so that said anode of said second electron tube maintains the same signal potential as said first junction point, said first and fourth windings being coupled so that said anode of said first electron tube maintains the same signal potential as said second junction point, means for maintaining said grid of said first electron tube at a fixed D. C. potential with respect to said first junction point, means for maintaining the grid of said second electron tube at a fixed D. C. potential with respect to said second junction point, said first and second secondary windings being so connected that the signals to be amplified are supplied to the cathode of said first and second electron tubes, respectively, in oppositely phased relationship, and a load effectively electrically coupled between said first junction point and said second junction point.

2. An amplifier circuit in accordance with claim 1 wherein said first and said fourth windings and said second and said third windings are magnetically coupled.

3. An amplifier circuit in accordance with claim 1 wherein said first, second, third and fourth transformer windings are wound on the same core, said first and said fourth windings forming a first unity coupled pair and said second and said third windings forming a second unity coupled pair.

4. An amplifier circuit in accordance with claim 1 wherein said means for maintaining said grids at fixed D. C. potentials with respect to said junction points comprise, a source of D. C. bias potential, a fifth transformer winding magnetically coupled to said third transformer winding, said fifth transformer winding being arranged such that the signal potential appearing thereacross is substantially identical to the signal potential appearing across said third transformer winding, means including at least said fifth transformer winding connecting said grid of said first electron tube to said source of bias potential, a first by-pass capacitor coupling said grid of said first electron tube to said first junction point, a sixth transformer winding magnetically coupled to said fourth transformer winding, said sixth transformer winding being arranged such that the signal potential appearing thereacross is substantially identical to the signal potential appearing across said fourth transformer winding, means including at least said sixth transformer winding connecting said grid of said second electron tube to said source of bias potential, and a second by-pass capacitor coupling said grid of said second electron tube to said second junction point.

5. An amplifier circuit comprising a transformer including at least four substantially electrically identical transformer windings, the first and fourth windings forming a first pair with substantially unity coupling between the two windings of said first pair, said second and third windings forming a second pair with substantially unity coupling between the two windings of said second pair, said windings of each pair being arranged so that the turns of one winding of each pair maintain substantially the same signal potential as adjacent corresponding turns of the other winding of that pair, said windings of said two pairs being further arranged so that the alternating flux produced by the windings of one pair is in an aiding relationship to the alternating flux produced by the windings of the other pair, first and second electron tubes each having at least an anode, a cathode and a control grid, a source of anode supply potential having a positive terminal and a negative terminal, said first transformer winding being connected between said anode of said first electron tube and said positive terminal of said source of anode supply potential, said second transformer winding being connected between said anode of said second electron tube and said positive terminal, an input transformer having a primary winding to which a signal to be amplified may be supplied, and first and second secondary windings, said third transformer winding being connected between said negative terminal of said source of anode supply potential and a first junction point with one terminal of said first secondary winding, the other terminal of said first secondary winding being connected to the cathode of said first electron tube, said fourth transformer winding being connected between said negative terminal of said source of anode supply potential and a second junction point with one terminal of said second secondary winding, the other terminal of said second secondary winding being connected to the cathode of said second electron tube, said second and said third windings being connected so that said anode of said second electron tube maintains the same signal potential as said first junction point, said first and fourth windings being connected so that said anode of said first electron tube maintains the same signal potential as said second junction point, means for maintaining said grid of said first electron tube at a fixed D. C. potential with respect to said first junction point, means for maintaining the grid of said second electron tube at a fixed D. C. potential with respect to said second junction point, said first and second secondary windings being so poled that the signals to be amplified are supplied to the cathode of said first electron tube and the cathode of said second electron tube, respectively, in oppositely phased relationship, and a load effectively electrically coupled between said first junction point and said second junction point.

6. An amplifier circuit in acordance with claim 5 wherein said means for maintaining said grids at fixed D. C. potentials with respect to said junction points comprise, a source of D. C. bias potential, a fifth transformer winding magnetically coupled to said third transformer winding, said fifth transformer winding being arranged such that the signal potential appearing thereacross is substantially identical to the signal potential appearing across said third transformer winding, means including at least said fifth transformer winding connecting said grid of said first electron tube to said source of bias potential, a first by-pass capacitor coupling said grid of said first electron tube to said first junction point, a sixth transformer winding magnetically coupled to said fourth transformer winding, said sixth transformer winding being arranged such that the signal potential appearing thereacross is substantially identical to the signal potential appearing across said fourth transformer winding, means including at least said sixth transformer winding connecting said grid of said second electron tube to said source of bias potential, and a second by-pass capacitor coupling said grid of said second electron tube to said second junction point.

7. An amplifier circuit comprising a transformer including at least six substantially electrically identical, magnetically coupled transformer windings, the first and fourth windings forming a first pair with substantially unity coupling between the two windings of said first pair, said second and third windings forming a second pair with substantially unity coupling between the two windings of said second pair, said windings of each pair being arranged so that the turns of one winding of each pair maintain substantially the same signal potential as adjacent corresponding turns of the other winding of that pair, said windings of said two pairs being further arranged so that the alternating flux produced by the windings of one pair is in an aiding relationship to the alternating flux produced by the windings of the other pair, first and second electron tubes each having at least an anode, a filamentary cathode, and a control grid, a source of anode supply potential having a positive terminal and a negative terminal, said first transformer winding being connected between said anode of said first electron tube and said positive terminal of said source of anode supply potential, said second transformer winding being connected between said anode of said second electron tube and said positive terminal, transformer means having a first center tapped secondary winding connected to said filamentary cathode of said first electron tube for supplying filament power thereto and having a second center tapped secondary winding connected to said filamentary cathode of said second electron tube for supplying filament power thereto, an input transformer having a primary winding to which a signal to be amplified may be supplied, and first and second secondary windings, said third transformer winding being connected between said negative terminal of said source of anode supply potential and a first junction point with one terminal of said first secondary winding of said input transformer, the other terminal of said first secondary winding of said input transformer being connected to the center tap of said first center tapped secondary winding, said fourth transformer winding being connected between said negative terminal of said source of anode supply potential and a second junction point with one terminal of said second secondary winding of said input transformer, the other terminal of said second secondary winding of said input transformer being connected to the center tap of said center tapped secondary winding, said second and said third windings being connected so that said anode of said second electron tube maintains the same signal potential as said first junction point, said first and fourth windings being connected so that said anode of said first electron tube maintains the same signal potential as said second junction point, the source of D. C. bias potential, means including at least a fifth one of said six transformer windings connecting said grid of said first electron tube to said source of bias potential, said fifth transformer winding being magnetically coupled to said third transformer winding, said fifth transformer winding being arranged such that the signal potential appearing thereacross is substantially identical to the signal potential appearing across said third transformer winding, a first by-pass capacitor coupling said grid of said first electron tube to said first junction point, means including at least the sixth of said six transformer windings connecting said grid of said second electron tube to said source of bias potential, said sixth transformer winding being magnetically coupled to said fourth transformer winding, said sixth transformer winding being arranged such that the signal potential appearing thereacross is substantially identical to the signal potential appearing across said fourth transformer winding, a second by-pass capacitor coupling said grid of said second electron tube to said second junction point, said first and second secondary windings of said input transformer being so connected that the signals to be amplified are supplied to the cathodes of said first and second electron tubes, respectively, in oppositely phased relationship, and load means electrically connected between said first junction point and said second junction point.

8. An amplifier circuit as in claim 7, said amplifier circuit further comprising a resistor and a capacitor connected in series between the control grid and cathode of said first electron tube and a resistor and a capacitor connected in series between the control grid and cathode of said second electron tube, said series combinations of resistors and capacitors comprising means for suppressing parasitic oscillations in said amplifier circuit.

References Cited in the file of this patent

UNITED STATES PATENTS

| | | |
|---|---|---|
| 1,948,303 | Lavoie | Feb. 20, 1934 |
| 2,462,903 | Romander | Mar. 1, 1949 |
| 2,506,158 | Mann et al. | May 2, 1950 |
| 2,742,616 | Merrill | Apr. 17, 1956 |